United States Patent [19]

Nishikawa et al.

[11] Patent Number: 4,633,737

[45] Date of Patent: Jan. 6, 1987

[54] METHOD AND APPARATUS FOR MINIMIZING PRESSURIZED FLUID FLOW IN AN AUTOMATIC TRANSMISSION

[75] Inventors: Masao Nishikawa, Tokyo; Shinzo Sakai; Junichi Miyake, both of Saitama, all of Japan

[73] Assignee: Honda Giken Kogyo Kabushiki Kaisha, Tokyo, Japan

[21] Appl. No.: 750,239

[22] Filed: Jul. 1, 1985

Related U.S. Application Data

[63] Continuation-in-part of Ser. No. 556,665, Dec. 6, 1983.

[30] Foreign Application Priority Data

Dec. 6, 1982 [JP] Japan ................................ 57-213572
Dec. 6, 1982 [JP] Japan ................................ 57-213573

[51] Int. Cl.[4] ........................ B60K 41/18; B60K 41/16

[52] U.S. Cl. ........................................ 74/866; 74/869; 74/752 A

[58] Field of Search ....................... 74/866, 869, 752 A

[56] References Cited

U.S. PATENT DOCUMENTS 3,938,409 2/1976 Uozumi ............................ 74/752 A
4,308,764 1/1982 Kawamoto et al. .............. 74/869 X
4,478,108 10/1984 Nishimura et al. ................... 74/866
4,519,273 5/1985 Shimizu et al. ................... 74/752 A

FOREIGN PATENT DOCUMENTS 0078846 6/1980 Japan ..................................... 74/869
0109849 8/1980 Japan ..................................... 74/866
2033985 5/1980 United Kingdom .................. 74/869

*Primary Examiner*—Kenneth J. Dorner
*Assistant Examiner*—Dirk Wright
*Attorney, Agent, or Firm*—Armstrong, Nikaido, Marmelstein & Kubovcik

[57] ABSTRACT

A method and device for controlling a plurality of magnet valves in an automatic transmission having a fluid torque converter, an anxiliary transmission equipped with a plurality of gear trains for transmitting the output torque of said torque converter to drive wheels through one of the selected gear trains, a plurality of shift valves to select said gear trains, and a plurality of magnet valves to drive said shift valves, wherein at least one of the magnet valves, which is subsequently driven to take an open-state at a time the gear train shifts up from the lowest speed to the second lowest speed, is closed at about the time of stalling of said torque converter and those magnet valves other than said closed magnet valve are opened after a short time delay after said magnet valve is opened when the vehicle velocity reaches the second lowest speed.

8 Claims, 5 Drawing Figures

METHOD AND APPARATUS FOR MINIMIZING PRESSURIZED FLUID FLOW IN AN AUTOMATIC TRANSMISSION

This application is a continuation-in-part of application Ser. No. 556,665 filed Dec. 6, 1983,

BACKGROUND OF THE INVENTION

The present invention relates to a control method and device for an electrically controlled automatic transmission used in an automobile, wherein the gear changing operation of the automatic transmission is executed by the change-over action of change-over valves driven by pilot-type solenoid valves actuated by magnetization or demagnetization of the solenoids, according to commands from a control circuit.

In the prior art of control devices of this type, small magnetic valves of the poppet-type were used as the pilot valves because, if the shift valve which works to select a desirable gear ratio was directly driven by the solenoid, a large electric current had to be applied through the solenoid which resulted in undesirable heat generated thereby.

As the solenoid valve of this type fulfills its pilot function by returning a part of the pressurized oil back to a tank according to magnetization or demagnetization of the solenoid, there is a possibility that the desirable oil pressure required in a total control system of the automatic transmission can not be maintained, if a plurality of magnetic pilot valves simultaneously open to return the pressurized oil back to the tank.

The maximum oil pressure required in a control system for an automatic transmission used in an automobile occurs at stall starting, however, the engine, at the moment of starting, does not rotate at a rotation speed higher than the stall rotation speed determined by a torque-convertor capacity. Therefor, in order for the quantity of oil fed by a pump to compensate the total oil quantity returned back to a tank in the total control system as well as, at the same instance, to maintain the required maximum oil pressure, one should either design the pump to have sufficient capacity or design the control system in a manner such that the returning oil quantity is minimized. From the standpoint of saving energy, the latter is better than the former.

On the other hand, considering the possibility of accidents or trouble like incomplete contact or disconnection of an electric line connected to the solenoid of the magnet valve, it is desirable to design the system to have a gear ratio for high speed, as high as possible, at demagnetization of the solenoid. This is easily understood from the fact that, in the system so designed to have a gear ratio for low speed at demagnetization of the solenoid, the automatic transmission, if there is a malconnection or disconnection of an electric wire connected to the solenoid during high speed driving, shifts suddenly down to the gear ratio of low speed which would cause damage to the engine by overrunning.

Moreover, in order to design the magnet valve, used as a pilot valve, to be small and simple, it is preferable to design it such that an armature is pulled into the solenoid in response to magnetization thereof to open the poppet.

To design the control system complying with the abovementioned conditions, in the case of a three-phase gear-ratio automatic transmission, the control system must have a function such that all the solenoids are demagnetized at the third speed (top gear) allowing, theoretically, no quantity of oil to return from the pilot valves and, on the other hand, they are all magnetized at the first speed (low gear) letting the maximum quantity of oil to return from the pilot valves.

In this design, however, the quantity of returning oil becomes maximum at stall starting so that it is quite difficult to get sufficient oil pressure required for the total control of the system at stall starting as mentioned above.

SUMMARY OF THE INVENTION

The present invention was developed to overcome the abovementioned disadvantages. An object of the present invention is to provide an electrically controlled method and device for an automatic transmission used in an automobile that reduces, as much as possible, the frequency of a situation in which the oil returns back to a tank by opening, simultaneously, a plurality of magnet valves and avoids, if it is inevitable to open the plurality of magnet valves simultaneously, such a situation occuring at stalling.

Another object of the present invention is to actuate a magnet valve in a timed relationship to other magnet valves in order to keep said magnet valve in a state necessary for the next operation.

For this purpose, in the present invention, a first magnet valve, which is driven to take an open-state at the time the gear train shifts up from the lowest speed to the second lowest speed, is closed at about the time of stalling of the torque converter, then is reopened and the remaining valves are opended after a short period of time so that a short time of delay occurs after the opening of said first magnet valve before the other valves are opened.

DETAILED DESCRIPTION OF THE INVENTION

An embodiment of the present invention employed in an electrically controlled automatic transmission equipped with a three-phase gear-ratio for forward movement and a single gear-ratio for backward movement is described hereinafter together with accompanying drawings.

Figure 1:
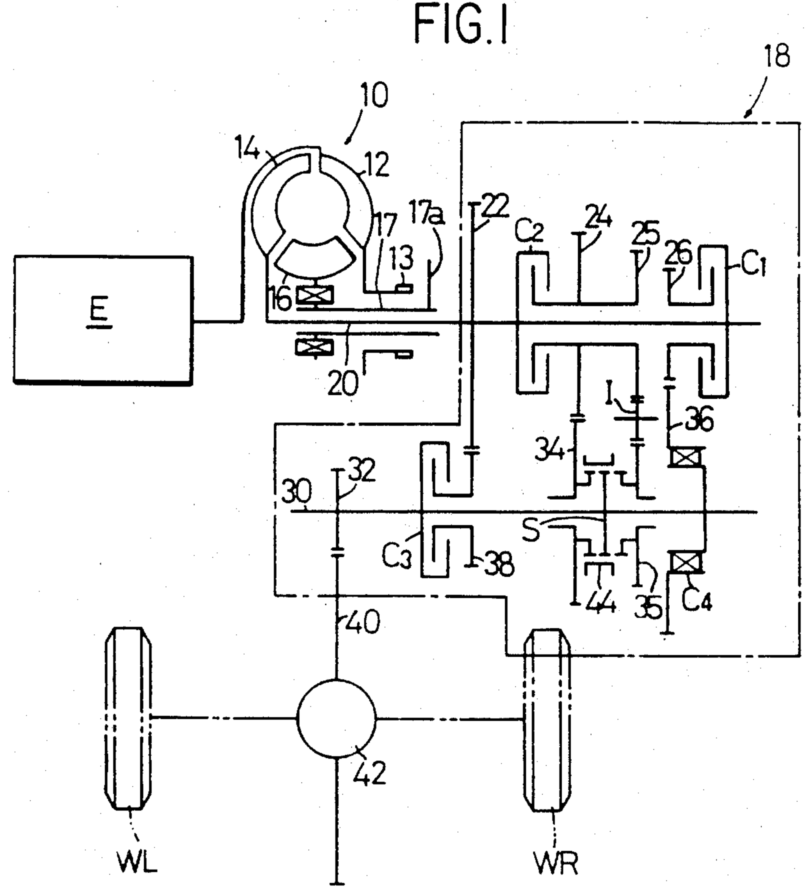
FIG. 1 illustrates a schematic diagram of the present invention employed in an electrically controlled automatic transmission equipped with a three-phase gear-ratio for forward movement and a single gear-ratio for backward movement.
Figure 2:
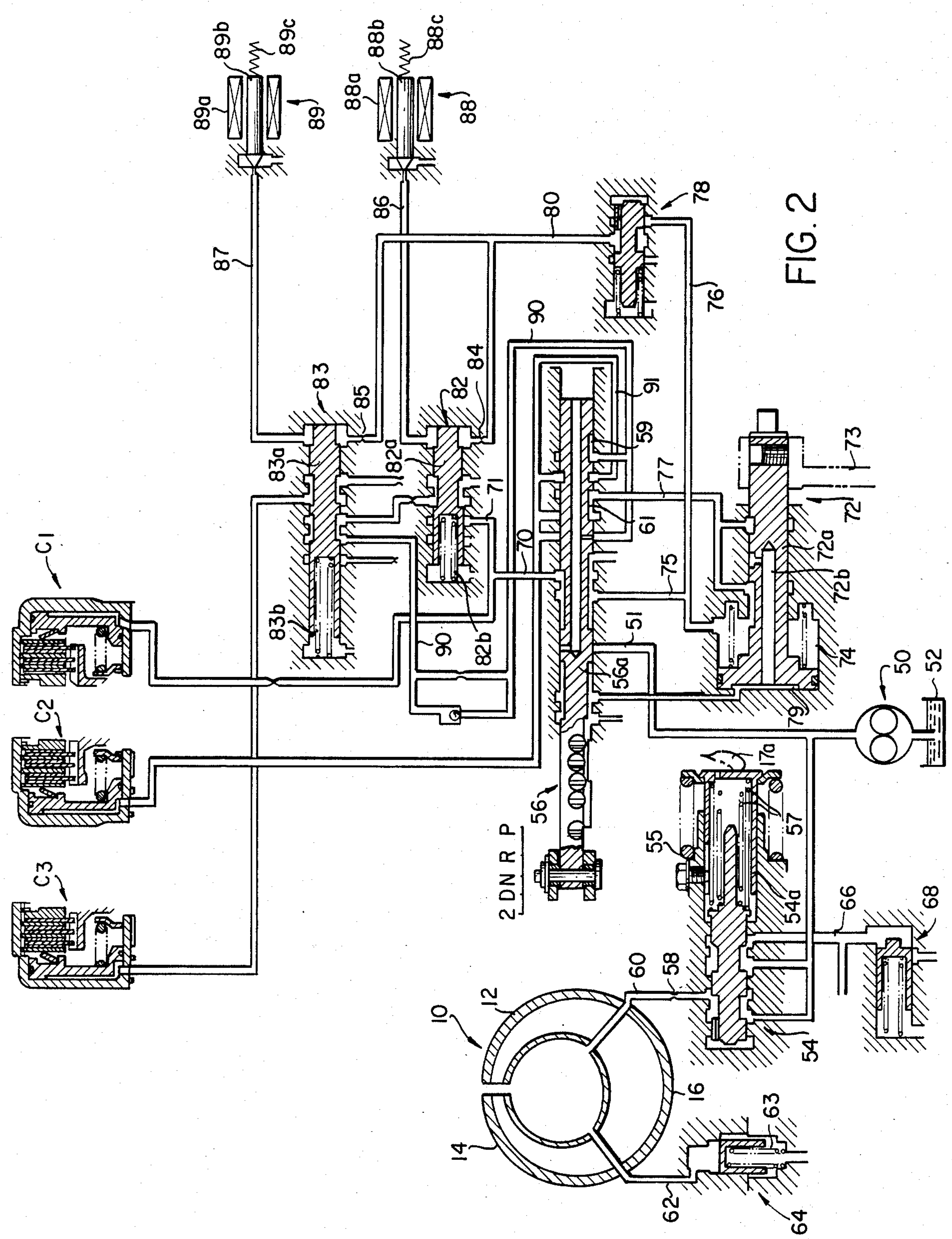
FIG. 2 illustrates a pressurized oil control system for the automatic transmission of FIG. 1.

In FIG. 1, the output of an engine E is transmitted to a pump impeller 12 in a fluid torque converter 10, then hydrodynamically to a turbine blade 14. If there is a relative speed difference between the impeller 12 and the blade 14 and a torque amplification action thereby, a stator 16 bears the reaction force caused by the torque amplification action. The pump impeller 12 is provided with a gear 13 through which an oil pump 50 shown in FIG. 2 is driven. The moment when the reaction force of stator 16 exceeds a predetermined value, a stator shaft 17 begins to rotate, pressing a regulator valve 54 shown in FIG. 2 by its top-end arm 17*a* so that line pressure, or output pressure of the oil pump 50, is increased. An output axis 20 of the torque converter 10 works also as an input axis of an auxiliary transmission 18. Upon this output axis, or the input axis 20 of the auxiliary transmission 18, from left to right in FIG. 1, a third-speed drive gear 22, second-speed clutch C2 and first-speed clutch C1 are provided in this order.

In addition to these, a second-speed drive gear 24 and a first-speed drive gear 26 both of which rotate with the input axis 20 as one body upon engagement of both clutches C1 and C2, are loosely inserted around this input axis 20. The second-speed drive gear 24 is integrally provided with a backward movement drive gear 25. Upon a counter shaft 30 which is parallel to the input axis 20, from left to right in FIG. 1, a final drive gear 32, a third-speed clutch C3, a spline which selectively engages with either the second-speed driven gear 34 or the backward movement driven gear 35, and a first-speed driven gear 36 are provided. One-way clutch C4 which transmits only such torque as given from the engine E is provided between the first-speed driven gear 36 and the counter shaft 30. A third-speed driven gear 39 which rotates with the third-speed clutch C3 and the counter shaft 30 as one body upon engagement of the third-speed clutch C3 is loosely provided around the counter shaft 30. Two gears 25 and 35, for backward movement, are engaged with each other through an idle gear I located therebetween.

The drive torque from final gear 32 is transmitted to a final driven gear 40, then to the left and right front wheels WL and WR through a differential gear 42 which engages with said final driven gear 40.

For backward movement, a selector sleeve 44 is driven to slide rightward in FIG. 1 by a shift folk 73 (see FIG. 2) in order to engage the counter shaft 30 with the backward driven gear 35 as well as to engage the second-speed clutch C2.

In FIG. 2, the oil pump 50 driven by pump impeller 12, as mentioned above, pressurizes the oil pumped out of tank 52 and sends it to the manual valve 56, after the oil pressure is regulated by a regulator valve 54. The arm 17*a* provided at stator shaft 17 (see FIG. 1) butts against a spring cylinder 54*a* of regulator valve 54 and, when the force upon the stator exceeds a certain level (in other words, when the torque amplification ratio of the torque converter exceeds a certain standard level), the spring cylinder 54*a* is forced to move leftward in FIG. 2 compressing a stator spring 55 as well as increasing the set load of the regulator spring 57. Consequently, the output pressure of oil pump 50, or the pressure in oil passage 51 increases.

A part of the pressurized oil regulated by regulator valve 54 is fed into torque converter 10 through an oil passage 60 equipped with a throttle 58, to intensify the oil pressure within torque converter 10 thereby, preventing the generation of cavitation therein. The oil pressure within torque converter 10 is determined by the degree the throttle 58 is open strength of spring 63 of a non-return valve 64 provided in an outlet passage 62, and others. The oil fed out of non-return valve 64 returns back to tank 52 through an oil cooler (not shown). A regulator valve 68 is provided at an oil passage 66 in order to secure the oil-feeding head of a required minimum level, while the surplus oil from the output of oil pump 50 is fed to each lubricating portion through oil passage 66. The pressurized oil fed to manual valve 56 through the oil passage 52 is not distributed any further as long as a plunger 56*a* of manual valve 56 is located at a neutral position (N) as shown in FIG. 2.

When plunger 56*a* moves leftward for one step to obtain a drive position (D) from the neutral position (N) in FIG. 2, oil passage 52 connects to an oil passage 70 leading to the first-speed clutch Cl 1 as well as to a spring chamber 74 of a servo-motor 72 which works to move a selector sleeve 44. At this moment the gear ratio for first speed is obtained. Servo-motor 72 stops at the left position shown in FIG. 2, holding the selector sleeve 44 in the position shown in FIG. 1 through the shift fork 73, the backward gear train 25, I and 35 is maintained in an idle position. The pressurized oil fed into spring chamber 74 of servo-motor 72 is fed to a modulator valve 78 through oil passage 76 and then, after modulating its maximum pressure by means of modulator valve 78, is further fed to the right end chamber of a 1-2 shift valve 82 through oil passage 80 and a throttle 84 as well as to a right end chamber of a 2-3 shift valve 83 through the passage 80 and a throttle 85. Each right end chamber of the shift valves 82 and 83 connects to tank 52 through oil passages 86 and 87 on which poppet-type magnet valve 88 and 89 are provided respectively. Each plunger 82*a* or 83*a* of the shift valve 82 or 83 is pushed rightward by a spring 82*b* or 83*b* stored within the left and chamber and operates according to the oil pressure within the right end chamber. That is, when the oil pressure is introduced into the right end chamber, each plunger 82*a* or 83*a* moves leftward against spring 82*b* or 83*b* and, on the other hand, when the oil pressure within each right end chamber is released, plunger 82*a* or 83*a* moves rightward by means of spring 82*b* or 83*b*.

When plunger 82*a* is at the right hand position of the 1-2 shift valve 82 as shown in FIG. 2, only the first-speed clutch C1 engages as oil passage 71, diverging from oil passage 70, is closed off by plunger 82*a*.

When plunger 82*a*, on the other hand, is located at the lefthand position with plunger 83*a* of the 2-3 shift valve 83 being located the righthand position as shown in FIG. 2, oil passage 71 is connected to oil passage 90 through the 1-2 shift valve 82 and the 2-3 shift valve 83 and further to oil passage 91 through a circular groove 59 of the manual valve 56 at the "D" position. As a result, the second-speed clutch C2 becomes engaged. However, the first-speed clutch C1 is still engaged at that stage, the gear ratio of the second speed is obtained by way of the one-way clutch C4 (see FIG. 2). When the 1-2 shift valve 82 as well as the 2-3 shift valve 83 is located at the lefthand position, oil passage 71 is connected to the third-speed clutch C3 through the two shift valves 82 and 83 with the oil passage 90, at the same time, connecting to the tank 52. As a result, the second-speed clutch C2 disengages so that the gear ratio of the third speed (top) is obtained.

The rightward and leftward motion of plunger 82*a* or 83*a* of the 1-2 shift valve 82 or 2-3 shift valve 83 corresponds to the magnetization and demagnetization of the solenoid 88*a* or 89*a* of corresponding magnet valve 88 or 89. Namely, in each magnet valve 88 or 89, the poppet-type valve body 88*b* or 89*b* is pulled into solenoid 88*a* or 89*a* when it is magnetized, so as to open the valve, while, on the other hand, pushed leftward by the force of spring 88*c* or 89*c* when solenoid 88*a* or 89*a* is demagnetized, so as to close the valve. As a result, when the solenoid 88*a* or 89*a* is magnetized, the oil pressure within the right end chamber decreases, so as to move plunger 82*a* or 83*a* rightward, while, on the contrary, when the solenoid 88*a* or 89*a* is demagnetized, the oil pressure within the right end chamber increases so as to move the plunger 82*a* or 83*a* leftward.

The explanation above-mentioned is the engagement situation of each of clutches C1–C3 with the manual valve 56 located at the "D" position. When plunger 56*a* of the manual valve 56 is further moved leftward and located at the "2" position, oil passage 70 is closed off from oil passage 51, whereby the first-speed clutch C1 becomes disengaged. The oil passage 51 is connected to the second-speed clutch C2 through the oil passage 75, 77, the circular groove 59 and the oil passage 91, so that, in response to that, the second-speed clutch C2 is engaged. The third-speed clutch C3, at the same time, connects to tank 52 through the oil passage either of the 2-3 shift valve 82, or of this and the 1-2 shift valve 82, or of these two and the manual valve 52 so that the gear ratio of the second-speed is maintained regardless of magnetization or demagnetization of solenoids 88*a* and 89*a*.

When plunger 56*a* of the manual valve 56 is located at the backward (R) position having moved rightward from the position shown in FIG. 2, the high-pressure oil passage 51 connects to the left end chamber 79 of the servo-motor 72 through said manual valve 56. In response to this, a piston 72*a* of the servo-motor 72 moves righward pushing the selector sleeve 44 (shown in FIG. 1) rightward through the shift fork 73, so that a backward gear train 25, I and 35 comes to an operational position. The oil passage 51 connects to the oil passage 77 through an oil passage 72*b* provied at the center of piston 72*a* and, further, to the second-speed clutch C2 through another circular groove 61 of manual valve 56, so the backward gear is obtained.

The relation between each gear change situation and the solenoid 88*a* and 89*a* of magnet valve 88 and 89 is summarized in Table 1.

TABLE 1

| Position of manual valve 56 | gear change | Solenoid 88a | Solenoid 89a |
|---|---|---|---|
| D | First-speed | Magnetization | Arbitrary |
| | Second-speed | Demagnetization | Magnetization |
| | Third-speed | Demagnetization | Demagnetization |
| 2 | Second-speed | Arbitrary | Arbitrary |
| R | Backward | Arbitrary | Arbitrary |

Since the quantity of oil returning back to tank 52 from the magnet valves 88 and 89 is theoretically zero when the solenoids 88*a* and 89*a* are demagnetized, instead the "arbitray" in Table 1 "demagnetization" should be chosen. That is, it is desirable to demagnetize the solenoid 89*a* at the first-speed and then to magnetize it at the second-speed, however, in this control system, there is the possibility of a situation where both solenoids 88*a* and 89*a* would simultaneously provide a demagnetized-state at the moment of shifting up to the second-speed. Moreover, in order to shift up the automatic transmission, with the manual valve 56 being in "D" position, from the first-speed to the second-speed (namely, at stalling) without causing any delay in operation, it is preferable to keep the solenoid 89*a* in the "magnetization" state during the first-speed. It is, therefore, preferable to demagnetize the solenoid 89*a* at the first-speed but to magnetize it immediately before the gear train shifts up to the second-speed.

At this moment, as both magnet valves 88 and 89 become open-state for a short period of time, a small quantity of oil returns back to the tank 52. This quantity, however, is very small and can be immediately compensated by the oil pump 50, so that it does not seriously affect the shifting-up operation. The present invention has a system to control the magnet valves as mentioned above, which is hereinafter described.

Figure 3:
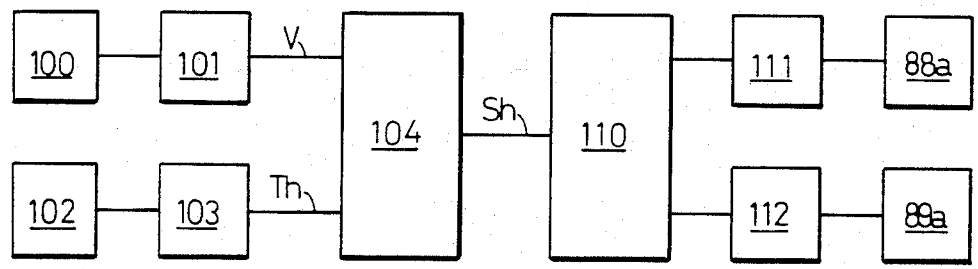
FIG. 3 illustrates a block diagram of a control circuit to control solenoid 88*a* and 89*a*.

FIG. 3 is a block diagram of the control circuit to control solenoids 88*a* and 89*a* as mentioned above. In FIG. 3, the signal obtained by a vehicle velocity sensor 100 is converted to an electric signal V through a vehicle velocity detection circuit 101 and sent to a gear change position determination circuit 104. The signal obtained by a throttle sensor 102 is converted to an electric signal Th, in response to the degree the throttle is open, by a throttle detection circuit 103 and sent to the gear change position determination circuit 104.

The gear change position determination circuit 104 determines the gear change position according to the input vehicle velocity signal V and the throttle signal Th as well as output of the gear change signal Sh. This gear change signal Sh is sent to the solenoid control circuit 110 which sends the drive signal to solenoid drive circuits 111 and 112 of the two solenoids 88*a* and 89*a*, respectively. The gear change position determination circuit 104 and the solenoid control circuit 110 are so designed as to provide a drive signal, which works to magnetize solenoid 89*a* immediately before shifting-up from the maximum gear-ratio, or first-speed, to the second-speed, to the solenoid drive circuit 112.

In the prior art, for example, the gear change signal Sh is directly sent to each solenoid drive circuit 111 or 112.

Figure 4A:
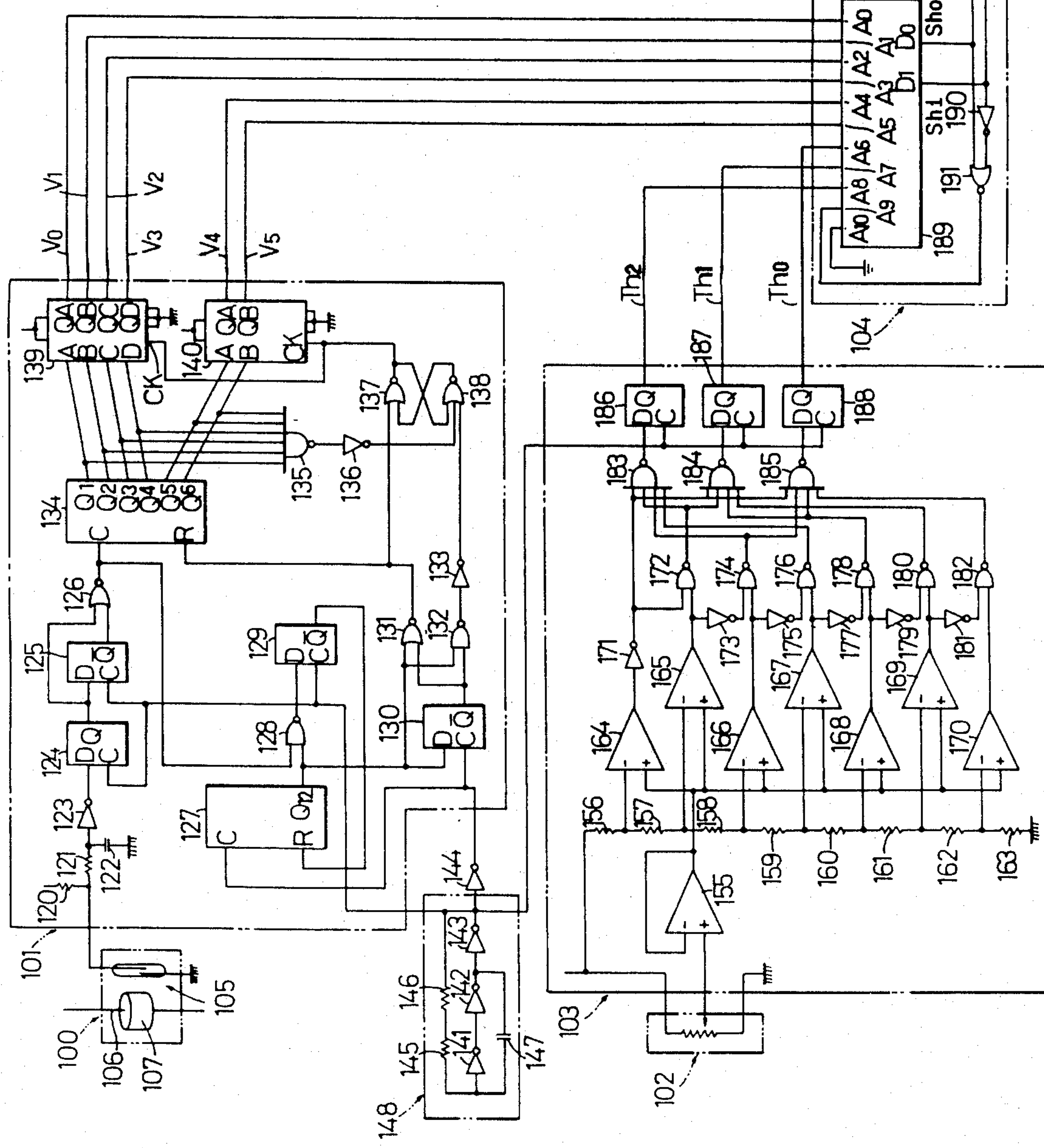
FIG. 4A illustrates a first embodiment of a precise circuit diagram of the block diagram shown in FIG. 3.

FIG. 4A shows a first concrete embodiment of the control circuit shown in FIG. 3, where the vehicle velocity sensor 100, having a lead switch 105 and a magnet 107 attached to a rotary member such as a speedometer cable rotating together with wheels, converts the rotation of the speedometer cable 106 to a pulse signal and sends it to a vehicle velocity detection circuit 101. In the vehicle velocity detection circuit 101, the signal from the vehicle velocity sensor 100 is fed to a data input terminal D of flip-flop 124 through resistance 120, 121, a condersor 122 and an inverter 123. The set output Q of flip-flop 124 is sent to one of the input terminals of NOR gate 126 as well as to a data input terminal D of flip-flop 125. To another input terminal of NOR gate 126 is sent a reset output $\overline{Q}$ of flip-flop 125. The output of NOR gate 126 is sent to one of the input terminals of NAND gate 128 as well as to a clock input terminal C of counter 134. The output Q12 of timer 127 is sent to another input terminal of NAND gate 128, whose output is sent to a data input terminal D of flip-flop 129. The reset output $\overline{Q}$ of flip-flop 129 is sent to a reset input terminal R of timer 127. The output Q12 of the timer 127 is also sent to one of the input terminals of NOR gate 131, one of the input terminals of NAND gate 132 and a data input terminal D of flip-flop 130. The reset output $\overline{Q}$ of flip-flop 130 is sent to another input terminal of NOR gate 131 and another input terminal of NAND gate 132, respectively while the output of NOR gate 131 is sent to a reset input terminal R of counter 134 and one of the input terminals of NOR gate 137. The output of NAND gate 132 is sent to NOR gate 138 through an inverter 133. Outputs Q1–Q4 of counter 134 are individually sent to input terminals A–D, respectively, of a transducer, as well as to NAND gate 135. Outputs Q5 and Q6 of counter 134 are respectively sent to input terminals A and B of transducer 140 as well as to NAND gate 135. The output of NAND gate 135 is sent to NOR gate 138 through and inverter 136. The output of NOR gate 138 is sent to another input terminal of NOR gate 137, whose output is sent to the clock input terminals CK of the transducers 139, 140 as well as to the residual input terminal of NOR gate 138. An oscillation circuit 148 is attached to the outside of the vehicle velocity detection circuit 101. In this oscillation circuit 148, a series circuit consisting of a resistance 145 and a variable resistance 146 and another series circuit consisting of three inverters 141, 412 and 143 are connected in parallel, and a condensor 147 is connected in parallel with two inverters 141 and 142. A clock pulse from oscillation circuit 148 is sent to each clock input terminal C of flip-flops 124, 125 and 129 and to each clock input terminal C of timer 127 and the flip-flop 130 through an inverter 144. The vehicle velocity detection circuit 101, constituted as mentioned above, is a so-called counter circuit and counts the input pulses from vehicle sensor 100 for a certain period of time determined by timer 127 and then provides the count number as a digital signal of 6 bits, V0–V5, at certain time intervals. Namely, a digital signal of 4 bits, V0–V3, are sent from the output terminals QA, QB, QC and QD of transducer 139, while that of 2 bits and V4, V5 are sent from that of QA and QB of transducer 140. A throttle sensor 102, being a potentiometer provided in relation to a throttle valve shaft (not shown) of engine E, sends a signal voltage, corresponding to the degree the throttle valve is open to amplifier 155 of throttle detection circuit 103. In the throttle detection circuit 103, output of the amplifier 155 is sent to each non-inversion input terminal of comparators 164, 165, 166, 167, 168, 169 and 170 respectively. Each inversion input terminal of comparators 164–170 receives a standard voltage divided by dividing resistances 156, 157, 158, 159, 160, 161, 162 and 163. The output of comparator 164 is given to one of the input terminals of NAND gate 172 as well as to NAND gate 183 through an inverter 171. The output of the comparator 165 is sent to one of the input terminals of NAND gate 174 through an inverter 173 as well as to the other input terminal of NAND gate 172. The output of the comparator 166 is sent to one of the input terminals of NAND gate 176 through inverter 175 as well as to the other input terminal of NAND gate 174. The output of the comparator 167 is sent to one of the input terminals of NAND gate 178 through an inverter 177 as well as to the other input terminal of NAND gate 176. The output of comparator 168 is sent to one of the input terminals of NAND gate 180 through an inverter 179 as well as to the other input terminal of NAND gate 178. The output of the comparator 169 is sent to one of the input terminals of NAND gate 182 through an inverter 181 as well as to the other input terminal of NAND gate 180. The output of the comparator 170 is sent to the other input terminal of NAND gate 182. The output of NAND gate 172 is sent to NAND gates 183, 184, the output of NAND gate 174 to NAND gates 183, 185, the output of NAND gate 176 to NAND gate 183, the output of NAND gate 178 to NAND gates 184, 185, the output of NAND gate 180 to NAND gates 184, and the output of NAND gate 182 to NAND gate 185. The output of each of NAND gates 183, 184 and 185 is individually sent to each input terminal D of flip-flops 186, 187 and 188 and clock pulse from said oscillating circuit is sent to the clock input terminal D of each of flip-flops 186, 187 and 188.

The throttle detection circuit 103 sends out a digital signal of 3 bits, Th0, Th1 and Th2 corresponding to the degree the throttle is open based upon the detection signal of the throttle sensor. Namely, out of flip-flop 188, the digital signal Th0 is sent out as its set output Q, out of flip-flop 187, the digital signal Th1 is sent as its set output Q, and, out of flip-flop 186, the digital signal Th2 is sent as its set output Q. Moreover, by selecting the resistance values of the variable resistances 156–163, the relation between the degree the throttle is open and its output can be set non-linear.

Figure 5A:
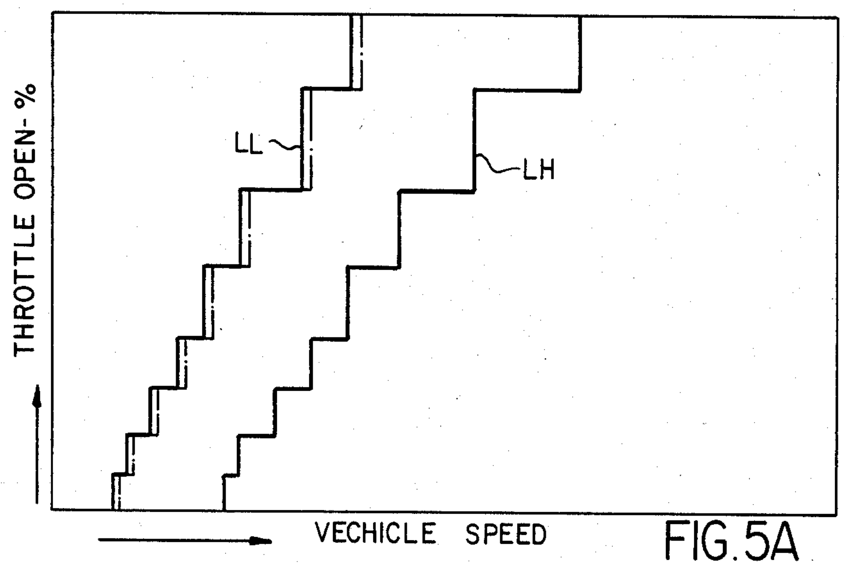
FIG. 5A illustrates a gear-change chart for the embodiment of FIG. 4A.

The gear change position determination circuit 104 is provided with a memory member 189. Vehicle velocity signals V0–V5 are respectively sent into the input terminals A0–A5 of the memory member 189, while the throttle signals Th0–Th2 are sent into the input terminals A6–A8. An input member A10, is connected to ground. The memory member 189 memorizing previously a gear change chart of the relation between the vehicle velocity and the throttle position as shown in FIG. 5A sends the gear change signals Sh0 and Sh1 from output terminals D0 and D1 respectively based upon the vehicle velocity signals and the throttle open degree signals sent into the input terminals A0–A8.

Incidentally, in the gear change position determination circuit 104, an inverter 190 and a NOR gate 191 are also included. An explanation about them is omitted here as they have no relation to the present invention.

The relation between the gear ratio and the gear change signals Sh0 and Sh1 are shown in Table 2.

TABLE 2

| gear ratio signal | first gear | second gear | third gear |
|---|---|---|---|
| Sh0 | H | L | L |
| Sh1 | H | H | L |

In Table 2, "L" means low level while "H" high level.

In FIG. 5A, which shows a gear change chart memorized in the memory member 189, the 1-2 solid shift line LL indicates the gear change position from first gear to second gear and the 2-3 solid shaft line LH shows the gear change position from second gear to third gear.

Referring back to FIG. 4A, the solenoid control circuit 110 is provided with a series circuit, connected to solenoid **88*a*, which comprises an inverter 204, a delay circuit 201, an inverter 205, and another series circuit, connected to solenoid 89*a*, which comprises inverters 206 and 207**.

The delay circuit 201, consisting of a resistance 202 and a condenser 203, sends out its input signal with a time delay determined by a time constant C.R, wherein C is the electrostatic capacity of condenser 203 and R is the resistance value of the resistance 202. The gear change signal Sh0 fed out of the gear change position determination circuit 104 is sent to inverter 204, delay circuit 201 and inverter 205, and the gear change signal Sh1 to inverters 206 and 207. Consequently, when both gear change signals Sh0 and Sh1 are sent to solenoid circuit 110, the one gear change signal Sh0 is sent out after the other gear change signal Sh1, with a time delay determined by time constant C.R.

The solenoid drive circuit 111 is equipped with a transistor 209, as a switching member, which is connected to a solenoid 88a to which base the output of inverter 205 in solenoid control circuit 110 is sent through resistance 208. Electric current, therefore, flows through transistor 209 when the gear change signal Sh0 is at the high level and, then, solenoid 88a is magnetized to open magnet valve 88. Transistor 209, on the other hand, is closed off when gear change signal Sh0 is at the low level and, then, solenoid 88a is demagnetized to close the magnet valve 88.

The solenoid drive circuit 112 is equipped with a transistor 211, as a switching member, which is connected to solenoid 89a to which base the output of inverter 207 in the solenoid control circuit 110 is sent through a resistance 210. Therefore, only when the signal sent to the base of the transistor 211 is at the high level, that is gear change signal Sh1 is at the high level, will transistor 211 become conductive in order to magnetize solenoid 89a.

The working of this first embodiment is explained with reference to FIG. 5A. When the vehicle velocity, as shown in FIG. 5A, is in a first speed region leftward from the 1-2 shift line LL, the gear change signal Sh0 is at a high level, while that of the Sh1 is at a low level, so that only solenoid 88a is magnetized, with solenoid 89a being demagnetized, thereby restricting the pressurized oil from returning back to tank 52 from the 2-3 shift valve 83. However, when the vehicle velocity exceeds the 1-2 shift line LL, the gear change signal Sh0 changes from a high to a low level, while the other change signal Sh1 changes from a low to a high level. The revolutions of engine E, and that of oil pump 50, increase to a certain level because the vehicle velocity is increasing, and it is possible to secure a sufficient quantity of pressurized oil so as to compensate for that which was returned to tank 52 through the magnet valves 88 and 89; therefore, the line pressure can be maintained.

When the vehicle velocity further increases and reaches the 2-3 shift line LH, the gear change signal Sh1 changes from a high to a low level. Then solenoid 89b is demagnetized to close magnet valve 89. The gear change signal Sh0, however, is kept at a low level and solenoid 89a is also kept at a demagnetized state to close magnet valve 88. As a result, the third speed gear-ratio is established at the position of the 2-3 shift line 1H.

As the gear change signal Sh0, however, is sent to solenoid drive circuit 111 through delay circuit 201, solenoid 89a is magnetized at the position of the 1-2 shift line LL to open magnet valve 89 while, on the other hand, solenoid 88a is demagnetized to close magnet valve 88 with a time delay of, for example, 0.5 seconds due to delay circuit 201 as shown in the dotted line in FIG. 5A. During the time period between the 1-2 shift line LL and the dotted line, both solenoids 88a and 89a are magnetized to open magnet valves 88 and 89 so that the pressurized oil returning to tank 52 increases. However, the line pressure of oil passage 51 is at the lowest level and, as clear from the above explanation, solenoid 89a, which is demagnetized to close the magnet valve 89a at about the time of stalling, is, at the 1-2 shift-up, first magnetized and then, after a short while, solenoid 88a is demagnetized, so that the pressurized oil returning back to tank 52 can be minimized at stall starting. Therefore, the necessary level of the line pressure required at stall starting can be maintained without enlarging the capacity of the oil pump 50.

Figure 4B:
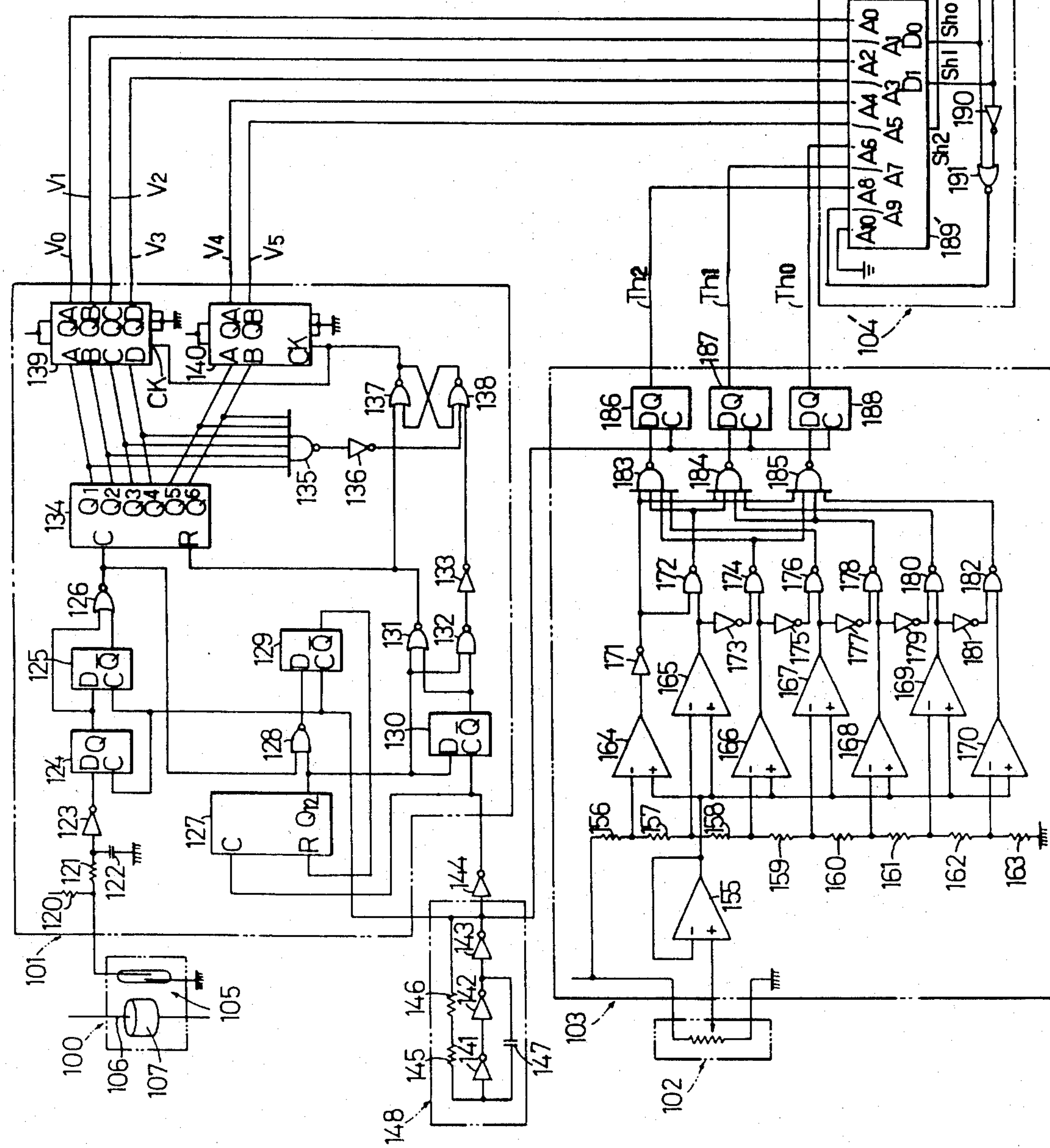
FIG. 4B illustrates a second embodiment of a circuit diagram.

A second embodiment of the invention is shown in FIG. 4B, which differs from that shown in the embodiment of FIG. 4A only in the solenoid control circuit and its connection to the position determining the circuit, the rest of FIG. 4B being identical to FIG. A.

Figure 5B:
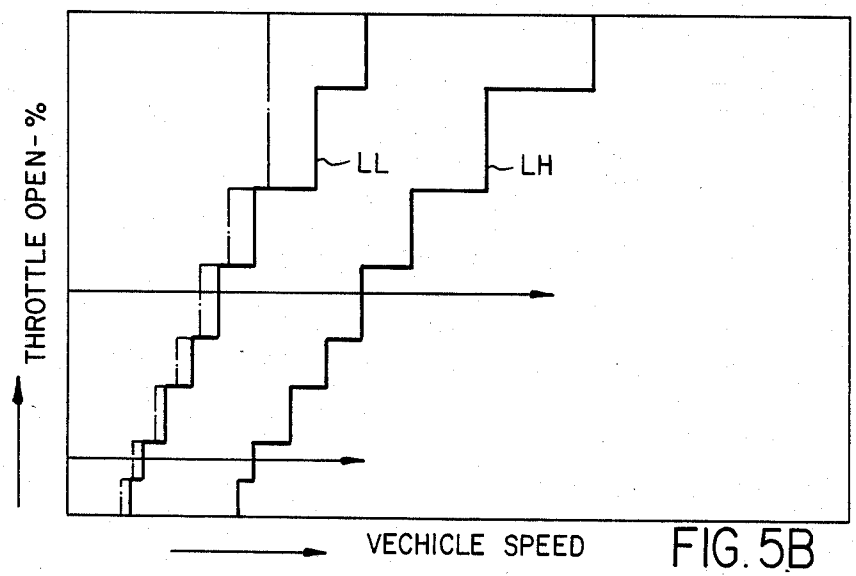
FIG. 5B illustrates a gear-change chart for the embodiment of FIG. 4B.

The gear change position determination circuit 104' is provided with a memory member 189' which receives the same inputs as memory member 189. The memory member 189' memorizes a gear change chart as shown in FIG. 5B, and sends the gear change signals Sh0 and Sh1 from output terminal D0 and D1 based upon the vehicle velocity signals and throttle open degree signals the same as memory member 189. Whereas in the first embodiment the gear change position determination circuit 104 provided only two gear change signals Sh0 and Sh1, gear change position determination circuit 104' is designed to send out an additional gear change signal Sh2 to magnetize the solenoid 89a immediately before the gear train shifts up from the first-speed to the second speed.

The solenoid control circuit 110 is provided with a series circuit connected to solenoid 88a, which comprises inverters 204' and 205', and another series circuit connected to solenoids 89a, which comprises NAND gate 206' and inverter 207'. The gear change signal Sh0 is sent to inverters 204' and 205', and gear change signals Sh1 and Sh2 to NAND gate 206'. Consequently, when the gear change signals are sent to solenoid circuit 110', the gear change signal Sh1, Sh2 is sent out before the gear change signal Sh0 by a timed interval determine by additional gear change signals Sh2.

Explaining this in FIG. 5B, in an area leftward from the one-dotted line, the gear-change signal Sh1 being at high level while the change gear signal Sh2 at low level, the solenoid 89a is demagnetized.

In an area between the one-dotted line and the 2-3 shift line LH, however, both gear change signals Sh1 and Sh2 being at high level, the solenoid 89a is magnetized.

Further, in an area rightward from the 2-3 shift line LH, the gear change signal Sh1 being at low level while the gear change signal Sh2 at high level, the solenoid 89a is demagnetized. As a result, only in the area between the one-dotted line and the 2-3 shift line LH., solenoid 89a is magnetized to open the magnet valve 89.

For the explanation of the operation of this embodiment, suppose the case in which the vehicle starts to move with its throttle having small degree $\theta 1$ the throttle is open is quite small and so is the output of the engine E, the torque converter 10 necessarily reaches a coupling point at low speed. Consequently reaction by the regulater valve 54 toward the arm 17a of the stator 17 is quite small so that line pressure of the oil passage 51 drops down to normal level immediately after starting. As a result, if the vehicle velocity is in the area leftward from the one-dotted line, only the solenoid 88a is magnetized, while the solenoid 89a is demagnetized, so that leakage of pressurized oil from the 2-3 shift valve 83 is restrained.

When the vehicle velocity exceeds the one-dotted line, that is immediately before time the gear train shifts up from the lowest speed (first) to the second lowest speed (second), however, the solenoid is also magnetized in order to prepare the next situation, namely the shift-up of the gear train from the first to the second, at which time the solenoid 88a is demagnetized.

In the area between the one-dotted line and the 1-2 shift line LL, the quantity of pressurized oil returning back to the tank 52 increases because, both solenoids 88*a* and 89*a* being magnetized, the magnet valves 88 and 89 are opened at that moment. As the line pressure of the oil passage 51 is at the lowest level and that the revolutions of the oil pump 50 as well as the engine E are increased to a certain level, it is possible to secure such a quantity of pressurized oil as to compensate for the volume returned back to the tank 52 through the magnet valves 88 and 89, so that the line pressure can be maintained.

When the vehicle velocity reaches the 1-2 shift line LL after exceeding the one-dotted line, the solenoid 89*a* is demagnetized so that the gear train of the second speed is obtained. And, further, when the vehicle velocity increases to reach the 2-3 shift line LH, the solenoid 89*a* is also demagnetized so that the gear train of the third-speed is obtained.

In the next place, suppose the case in which the vehicle starts to move with its throttle degree $\theta 2$ the throttle is open, which is larger than the degree $\theta 1$. In this case, as the degree the throttle is open is considerably large, the venicle velocity at which time the torque converter reaches a coupling point shifts higher than that vehicle velocity obtained by the case of the degree $\theta 1$. In response to this, the one-dotted line which shows the position where the solenoid 89*a* is to be magnetized shifts to the higher velocity side.

Similar to the first case, while the line pressure is high and, accordingly, leakage loss of the pressurized oil will be large, the solenoid 89*a* is kept demagnetized so that the pressurized oil returning back to the tank 52 through the 2-3 shift valve 83 is restrained.

In this case, however, as the output of the engine E is fairly large and so are the acceleration as well as the vehicle velocity, it is desirable to set the distance between the one-dotted line and the 1-2 shift line LL a little longer than that in the former case in which the vehicle starts with the throttle having degree $\theta 1$, considering that it always needs a constant period of time from starting to operate the magnet valve 89 until finishing the change over action of the 2-3 shift valve.

Finally suppose the case in which the vehicle starts to move with the throttle having the largest degree $\theta 3$ of open throttle. As the output of the engine E, in this case, is the largest, the vehicle velocity at which the line pressure, released from the largest stall pressure, restores to the normal level shifts further higher. Accordingly the one-dotted line which shows the position where the solenoid 89*a* is to be magnetized shifts to higher velocity side than that vehicle velocity obtained by the case of the degree $\theta 2$. In this case, however, as the oil pump is rotating at sufficient high revolutions and has an ample volume of the oil output, there are some range of choices to select the vehicle velocity at which the solenoid 89*a* should be magnetized and it may be set a little earlier than the position shown in FIG. 5.

It is clear from the above explanation that at about the time of stall starting, the solenoid 89*a* is demagnetized to close the magnet valve 89*a* and then magnetized immediately before the 1-2 shifting in order to prepare the coming shift-up operation, so that the pressurized oil returning back to the tank 52 can be minimized at stalling. Therefore the line pressure of necessary level required at stalling can be obtained without enlarging the cavity of the oil pump 50. It is desirable, as shown in the above embodiment, to set the series of starting points of magnetization as a stair-step line shown in one-dotted line in FIG. 5B, however, it is not an indispensable requirement of the present invention and the series of starting points of magnetization of the solenoid 89*a* may be set as shown either by the one-dotted or by the dotted line in FIG. 6.

The important point of the present invention, in short, is, after demagnetizing the solenoid 89*a* at about the time of stalling (the moment when the vehicle velocity is almost zero), to magnetize the solenoid 89*a* immediately before the starting of the 1-2 gear change, and thereafter magnetize solenoid 88*a*, or otherwise to demagnetize solenoid 89*a* at the time of the 1-2 gear change and delay magnetization of solenoid 88*a* for a short period. In either case, the two solenoids are both magnetized at the same time for a very short period of time whereby the valves are simultaneously open for only that short period, thus minimizing the amount of pressurized oil required at the time the 1-2 gear change takes place.

Figure 6:
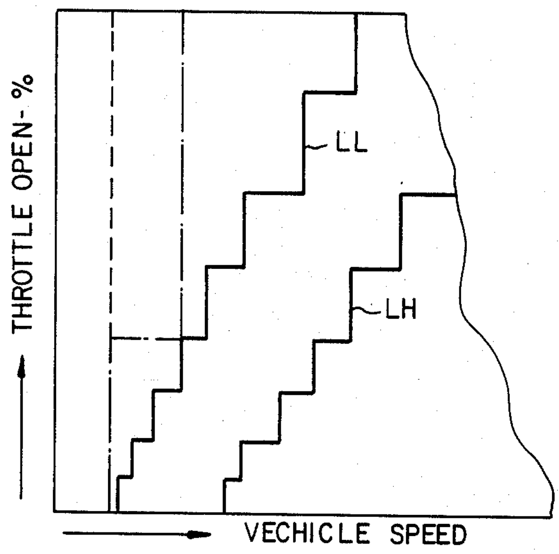
FIG. 6 illustrates a gear-change chart of another embodiment of the present invention.

If, by the bye, the starting points of magnetization of the solenoid 89*a* is set like shown either by one-dotted or by dotted line in FIG. 6, one only would have to enlarge the capacity of the oil pump 50 slightly larger than that used for one-dotted line in FIG. 5.

Further, although the above embodiments show the examples of the digitally controlled gear changes with gear change charts having stair-step lines as shown in FIGS. 5A, 5B and 6, the present invention is not intended to be restricted to this control system.

In the present invention, as mentioned above, the magnet valve, which is driven to take an open-state at the time the gear train shifts up from the lowest speed to the second lowest speed, is kept closed at about the time of stalling of the torque converter, and is driven to open at a vehicle velocity that is lower, a predetermined value, than the second lowest speed at which the shifting-up operation is to be executed, so that the quantity of the pressurized oil returning back to the tank at said stalling moment, where the maximum oil pressure is required, can be reduced.

Consequently the oil pump may have comparatively small capacity, which will contribute to save energy.

What is claimed is:

1. A method for controlling a plurality of magnet valves in an automatic transmission having a fluid torque converter, and auxiliary transmission equipped with a plurality of gear trains for transmitting the output torque of said torque converter to drive wheels through a selected one of the gear trains, a plurality of shift valves to select said gear trains, and a plurality of magnet valves to drive said shift valves, comprising the steps of:

(a) closing a first magnet valve, at about the time of stalling of said torque converter, which valve is subsequently to take an open-state at the time the gear train shifts up from the gear train of the lowest speed to that of the second lowest speed, (b) opening said first magnet valve near the time that the vehicle velocity reaches said second lowest speed; and (c) closing the remaining magnet valves when the vehicle velocity reaches a slightly higher speed, so that only a short time delay occurs after opening of said magnet valve before said remaining valves are closed.

2. The method according to claim 1, wherein the time delay is about 0.5 seconds.

3. In a gear change control system actuated by hydraulic valves which are operated by pressurized fluid, the operation of said hydraulic valves being controlled by a plurality of electrically operated valves which close to apply pressurized fluid pressure to a chamber of said hydraulic valves and open to release said fluid pressure, the method of operating said system to minimize the requirement for pressurized fluid during a gear change operation thereof which requires a plurality of electrically operated valves to be open at the same time comprising the steps of:

(a) placing said electrically operated valves in a first state wherein only a first one of said valves is open and the others of said electrically operated valves are closed;

(b) detecting a condition for initiation of said gear change operation;

(c) operating said electrically operated valves in response to said condition so that a second valve is opened to initiate said gear change operation; and (d) after a short time period, operating said electrically operated valves to close said first valve, whereby a plurality of said electrically operated valves are open for only said short time period.

4. The method recited in claim 3 wherein said operating steps include the steps of:

generating first and second electrical control signals for operating said first and second electrically operated valves, respectively, at the time of initiation of said gear change operation; and delaying the time of application of said first control signal to said first valve until a short time period after application of said second control signal to said second valve.

5. The method recited in claim 3 wherein said operating steps include the step of generating a first electrical control signal for operating said first valve and a second electrical control signal for operating said second valve, said second signal occurring a short period before the time of initiation of said gear change operation.

6. An automatic transmission comprising:

a fluid torque converter;

an auxiliary transmission equipped with a plurality of which selectively works to transmit the output torque from the said torque converter to drive wheels through one of said gear trains in a working position;

a plurality of shift valves which operate to shift the operation of said gear trains from a first speed range to a second speed range in response to an oil pressure working situation and an oil pressure released situation;

a plurality of magnet valves which operate to shut off the connection between said shift valves and a pressurized oil tank to cause said oil pressure working situation and to connect it to cause said oil pressure released situation to operate said shift valves;

a gear changed determination circuit, including memory means, which responds to detected vehicle velocity and throttle position signals to generate operating signals for said plurality of magnet valves in accordance with a predetermined sequence of vehicle velocity and throttle position values stored in a said memory means; and means connecting said operating signals to said plurality of magnet valves to actuate said valves in a given sequence, wherein a first magnet valve which is to be driven to an open state to cause said gear shift operation is closed and a second magnet valve which is to be driven to a closed state is open, and said operating signals include a first signal timed to drive said first magnet valve to said opened state and a second signal timed after a short period of time to drive said second magnet valve to said closed state, whereby said first and second magnet valves are both open for only said short period of time during said gear shift operation to thereby minimize the requirement for pressurized fluid during a gear shift operation.

7. An automatic transmission as recited in claim 6 wherein said gear change determination circuit operates to advance the time of said first operating signal for said first valve with respect to the time of said operating signal for said second valve.

8. An automatic transmission as recited in claim 6 wherein said means connecting said operating signals to said magnet valves delays the time of application of said second operating signal to said second valve for a short period of time after application of said application of said first operating signal to said first valve.

* * * * *